(12) United States Patent
Banning et al.

(10) Patent No.: US 8,920,551 B1
(45) Date of Patent: Dec. 30, 2014

(54) PHASE CHANGE INKS

(71) Applicant: Xerox Corporation, Norwalk, CT (US)

(72) Inventors: Jeffery H. Banning, Hillsboro, OR (US); Wolfgang G. Wedler, Tualatin, OR (US); Stephan V. Drappel, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/011,766

(22) Filed: Aug. 28, 2013

(51) Int. Cl.
*C09D 11/02* (2014.01)
*C09D 11/34* (2014.01)

(52) U.S. Cl.
CPC .................................... *C09D 11/34* (2013.01)
USPC .................................... 106/31.29; 106/31.61

(58) Field of Classification Search
CPC ....................................................... C09D 11/34
USPC ............................................. 106/31.29, 31.61
See application file for complete search history.

(56) References Cited

FOREIGN PATENT DOCUMENTS

WO          0071621 A1     11/2000

OTHER PUBLICATIONS

Banning et al., U.S. Appl. No. 14/012,222, filed Aug. 28, 2013, "Boron Subphthalocyanine Compounds and Method of Making".
Banning et al., U.S. Appl. No. 14/012,132, filed Aug. 28, 2013, "Boron Subphthalocyanine Compounds and Method of Making".
Brisson et al., "Boron Subphthalocyanine Dyes: 3-Pentadecylphenol as a Solubilizing Molecular Fragment," Ind. Eng. Chem. Res. 2011, 50, 10910-10917, Yr 2011 Month N/A.

*Primary Examiner* — Veronica F Faison
(74) *Attorney, Agent, or Firm* — MDIP LLC

(57) ABSTRACT

Disclosed is a phase change ink comprising a phase change ink carrier and a colorant compound of the formula

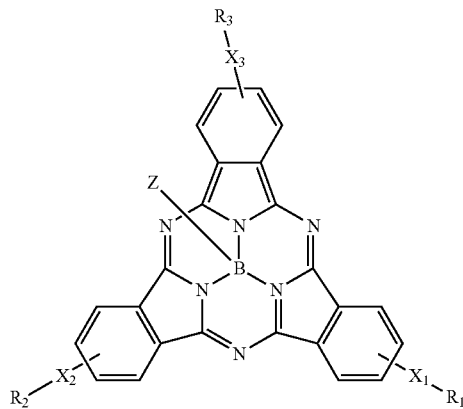

wherein $X_1$, $X_2$, and $X_3$ each, independently of the others, is —O—, —S—, —SO—, or —SO$_2$—; $R_1$, $R_2$, and $R_3$ each, independently of the others, is alkyl, aryl, arylalkyl, or alkylaryl as further defined herein; and Z is halogen, —OR$_4$, wherein $R_4$ is alkyl, aryl, arylalkyl, or alkylaryl as further defined herein,

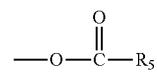

wherein $R_5$ is alkyl, aryl, arylalkyl, or alkylaryl as further defined herein, or

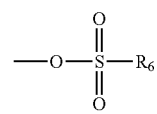

wherein $R_6$ is alkyl, aryl, arylalkyl, or alkylaryl as further defined herein.

20 Claims, No Drawings

PHASE CHANGE INKS

CROSS-REFERENCE TO RELATED APPLICATIONS

Reference is made to U.S. application Ser. No. 14/012,222, filed concurrently herewith, entitled "Boron Subphthalocyanine Compounds and Methods of Making," with the named inventors Jeffrey H. Banning, Wolfgang G. Wedler, and Stephan V. Drappel, the disclosure of which is totally incorporated herein by reference.

Reference is made to U.S. application Ser. No. 14/012,132, filed concurrently herewith, entitled "Boron Subphthalocyanine Compounds and Method of Making," with the named inventors Jeffrey H. Banning, Wolfgang G. Wedler, and Stephan V. Drappel, the disclosure of which is totally incorporated herein by reference.

BACKGROUND

Disclosed herein are phase change ink compositions. More specifically, disclosed herein are phase change inks containing colorant compounds particularly suitable for use in hot melt or phase change inks.

True "vibrant" magenta dyes are difficult to find or make. Such dyes that are soluble in and stable in phase change ink carriers are even more rare. Those that are available tend to be quite expensive to make. Magenta dyes that are soluble in phase change ink carriers, do not settle out from these carriers over time or with heat, are lightfast, and are less expensive to make than currently known phase change magenta dyes accordingly remain highly desirable. In addition, such a dye that can be modified in several ways to adjust different properties would be highly desirable.

SUMMARY

Disclosed herein is a phase change ink comprising a phase change ink carrier and a colorant compound of the formula

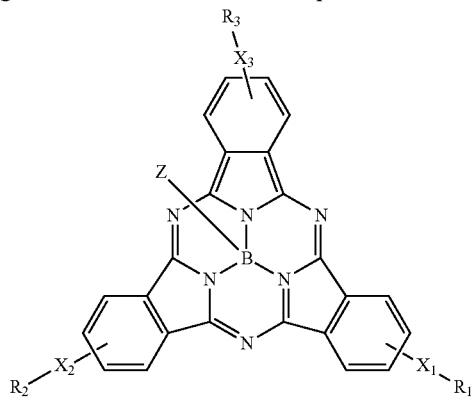

wherein $X_1$, $X_2$, and $X_3$ each, independently of the others, is —O—, —S—, —SO—, or —$SO_2$—; $R_1$, $R_2$, and $R_3$ each, independently of the others, is (1) alkyl, including substituted and unsubstituted alkyl, wherein hetero atoms may optionally be present in alkyl; (2) aryl, including substituted and unsubstituted aryl, wherein hetero atoms may optionally be present in aryl; (3) arylalkyl, including substituted and unsubstituted arylalkyl, wherein hetero atoms may optionally be present in either the aryl or the alkyl portion of arylalkyl; or (4) alkylaryl, including substituted and unsubstituted alkylaryl, wherein hetero atoms may optionally be present in either the aryl or the alkyl portion of alkylaryl; and Z is: (1) halogen; (2) —$OR_4$, wherein $R_4$ is: (A) alkyl, including substituted and unsubstituted alkyl, wherein hetero atoms may optionally be present in alkyl; (B) aryl, including substituted and unsubstituted aryl, wherein hetero atoms may optionally be present in aryl; (C) arylalkyl, including substituted and unsubstituted arylalkyl, wherein hetero atoms may optionally be present in either the aryl or the alkyl portion of arylalkyl; or (D) alkylaryl, including substituted and unsubstituted alkylaryl, wherein hetero atoms may optionally be present in either the aryl or the alkyl portion of alkylaryl; (3)

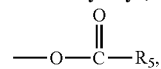

wherein $R_5$ is: (A) alkyl, including substituted and unsubstituted alkyl, wherein hetero atoms may optionally be present in alkyl; (B) aryl, including substituted and unsubstituted aryl, wherein hetero atoms may optionally be present in aryl; (C) arylalkyl, including substituted and unsubstituted arylalkyl, wherein hetero atoms may optionally be present in either the aryl or the alkyl portion of arylalkyl; or (D) alkylaryl, including substituted and unsubstituted alkylaryl, wherein hetero atoms may optionally be present in either the aryl or the alkyl portion of alkylaryl; or (4)

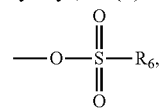

wherein $R_6$ is: (A) alkyl, including substituted and unsubstituted alkyl, wherein hetero atoms may optionally be present in alkyl; (B) aryl, including substituted and unsubstituted aryl, wherein hetero atoms may optionally be present in aryl; (C) arylalkyl, including substituted and unsubstituted arylalkyl, wherein hetero atoms may optionally be present in either the aryl or the alkyl portion of arylalkyl; or (D) alkylaryl, including substituted and unsubstituted alkylaryl, wherein hetero atoms may optionally be present in either the aryl or the alkyl portion of alkylaryl.

DETAILED DESCRIPTION

The phase change inks disclosed herein contain colorants of the formula

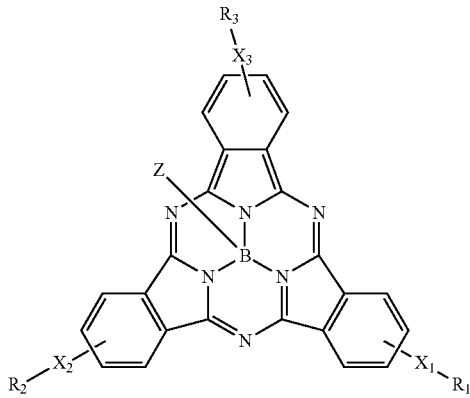

wherein:

(a) $X_1$, $X_2$, and $X_3$ each, independently of the others, is —O—, —S—, —SO—, or —$SO_2$—;

(b) $R_1$, $R_2$, and $R_3$ each, independently of the others, is:
(1) alkyl, including substituted and unsubstituted alkyl, wherein hetero atoms, such as oxygen, nitrogen, sulfur, silicon, phosphorus, boron, or the like, may optionally be present in alkyl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;
(2) aryl, including substituted and unsubstituted aryl, wherein hetero atoms, such as oxygen, nitrogen, sulfur, silicon, phosphorus, boron, or the like, may optionally be present in aryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;
(3) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons; or
(4) alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons; and (c) Z is:
(1) halogen, including fluorine, chlorine, bromine, and iodine;
(2) —$OR_4$, wherein $R_4$ is:
  (A) alkyl, including substituted and unsubstituted alkyl, wherein hetero atoms, such as oxygen, nitrogen, sulfur, silicon, phosphorus, boron, or the like, may optionally be present in alkyl, in one embodiment with at least about 1 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;
  (B) aryl, including substituted and unsubstituted aryl, wherein hetero atoms, such as oxygen, nitrogen, sulfur, silicon, phosphorus, boron, or the like, may optionally be present in aryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;
  (C) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons; or
  (D) alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;

(3)

$$-\text{O}-\overset{\overset{\displaystyle O}{\|}}{\text{C}}-R_5,$$

wherein $R_5$ is:
(A) alkyl, including substituted and unsubstituted alkyl, wherein hetero atoms, such as oxygen, nitrogen, sulfur, silicon, phosphorus, boron, or the like, may optionally be present in alkyl, in one embodiment with at least about 1 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;
(B) aryl, including substituted and unsubstituted aryl, wherein hetero atoms, such as oxygen, nitrogen, sulfur, silicon, phosphorus, boron, or the like, may optionally be present in aryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;
(C) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons; or (D) alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons; or (4)

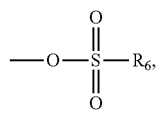

wherein $R_6$ is:

(A) alkyl, including substituted and unsubstituted alkyl, wherein hetero atoms, such as oxygen, nitrogen, sulfur, silicon, phosphorus, boron, or the like, may optionally be present in alkyl, in one embodiment with at least about 1 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;

(B) aryl, including substituted and unsubstituted aryl, wherein hetero atoms, such as oxygen, nitrogen, sulfur, silicon, phosphorus, boron, or the like, may optionally be present in aryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;

(C) arylalkyl, including substituted and unsubstituted arylalkyl, wherein the alkyl portion of arylalkyl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of arylalkyl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons; or (D) alkylaryl, including substituted and unsubstituted alkylaryl, wherein the alkyl portion of alkylaryl can be linear or branched, saturated or unsaturated, cyclic or acyclic, and substituted or unsubstituted, wherein hetero atoms, such as oxygen, nitrogen, sulfur, silicon, phosphorus, boron, or the like, may optionally be present in either the aryl or the alkyl portion of alkylaryl, in one embodiment with at least about 8 carbons, in another embodiment with at least about 12 carbons, and in yet another embodiment with at least about 18 carbons, and in one embodiment with no more than about 100 carbons, in another embodiment with no more than about 50 carbons, and in yet another embodiment no more than about 20 carbons;

wherein examples of the substituents that can be present on the substituted alkyl, aryl, arylalkyl, and alkylaryl groups include hydroxy, halogen, amine, imine, ammonium, cyano, pyridine, pyridinium, ether, aldehyde, ketone, ester, amide, carbonyl, thiocarbonyl, sulfate, sulfonate, sulfonic acid, sulfide, sulfoxide, phosphine, phosphonium, phosphate, phosphonate, nitrile, mercapto, nitro, nitroso, sulfone, acyl, acid anhydride, azide, azo, cyanato, isocyanato, thiocyanato, isothiocyanato, carboxylate, carboxylic acid, urethane (carbamate), urea (carbamide), silyl, siloxyl, silane, mixtures thereof, or the like, wherein two or more substituents can be joined together to form a ring.

Specific examples of $—X_1—R_1$, $—X_2—R_2$, and $—X_3—R_3$ include:

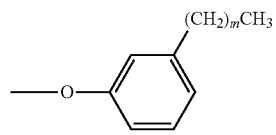

wherein m is an integer representing the number of repeat $CH_2$ units, being in one embodiment at least about 8, in another embodiment at least about 10, and in yet another embodiment at least about 15, and in one embodiment no more than about 50, in another embodiment no more than about 40, and in yet another embodiment no more than about 25, such as

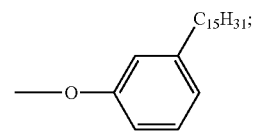

unsaturated variations thereof, such as

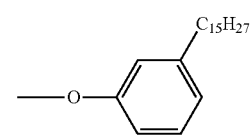

and

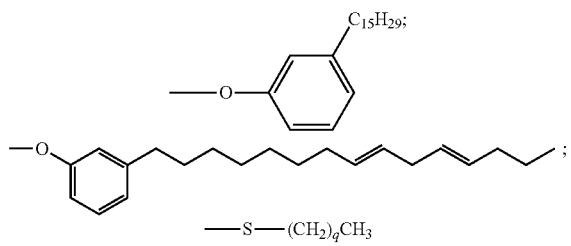

wherein q is an integer representing the number of repeat $CH_2$ units, being in one embodiment at least about 8, in another embodiment at least about 10, and in yet another embodiment at least about 15, and in one embodiment no more than about 50, in another embodiment no more than about 40, and in yet another embodiment no more than about 25, such as

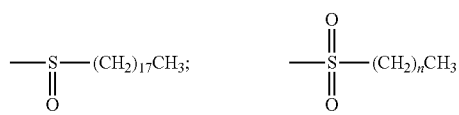

wherein p is an integer representing the number of repeat $CH_2$ units, being in one embodiment at least about 8, in another embodiment at least about 10, and in yet another embodiment at least about 15, and in one embodiment no more than about 50, in another embodiment no more than about 40, and in yet another embodiment no more than about 25, such as

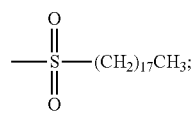

wherein n is an integer representing the number of repeat $CH_2$ units, being in one embodiment at least about 8, in another embodiment at least about 10, and in yet another embodiment at least about 15, and in one embodiment no more than about 50, in another embodiment no more than about 40, and in yet another embodiment no more than about 25, such as

—S(=O)₂—(CH₂)₁₇CH₃;

or the like, as well as combinations thereof.
Specific examples of —Z include:
—Cl;

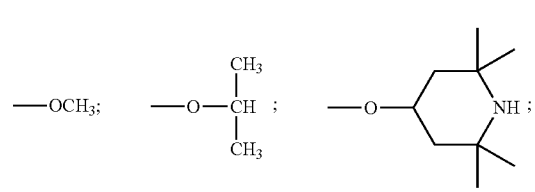

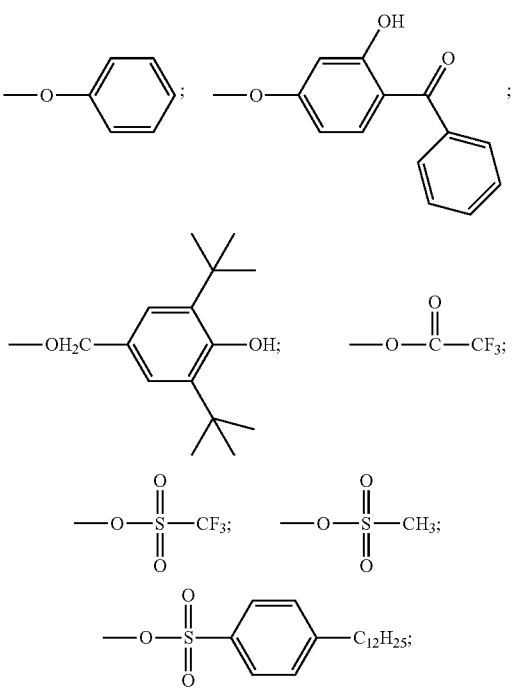

or the like, as well as combinations thereof.

In specific embodiments, —Z is a stabilizer moiety, such as a triazine UV-stabilizer:

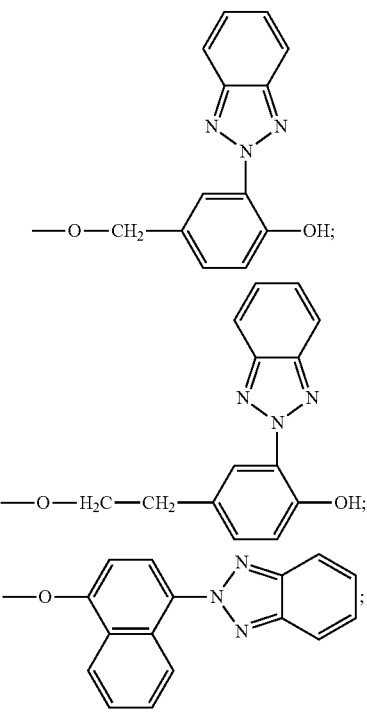

-continued
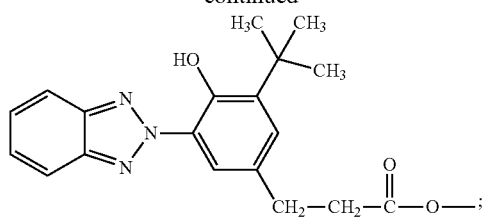
or an anthracene singlet or quencher:
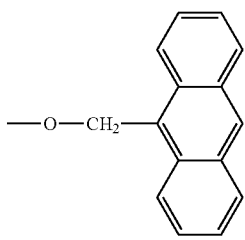 [SMILES: COCc1c2ccccc2cc2ccccc12]
or combination thereof, or a combination of one or more of these with another —Z group.
Specific examples of suitable colorants include:
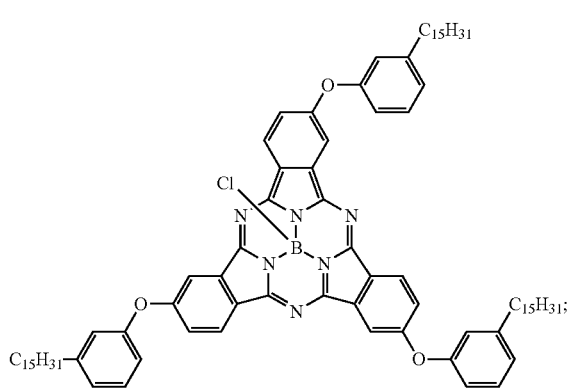
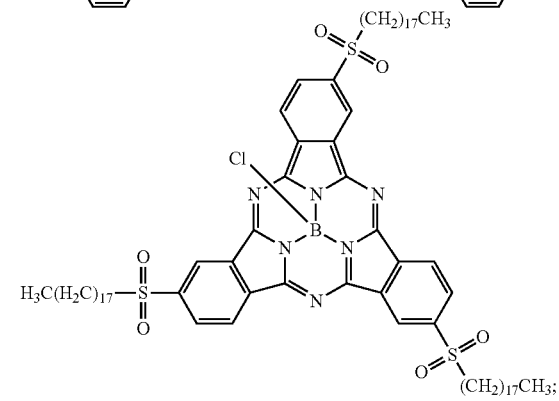
-continued
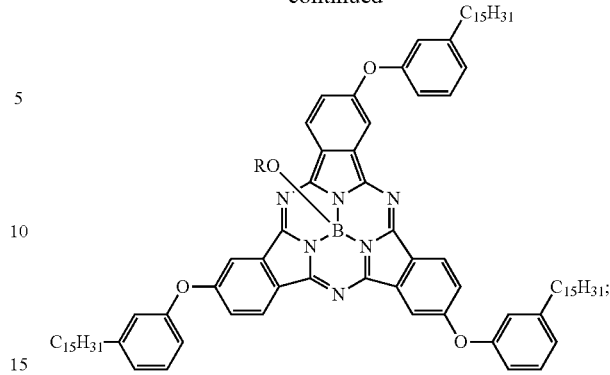
wherein R is methyl or isopropyl;
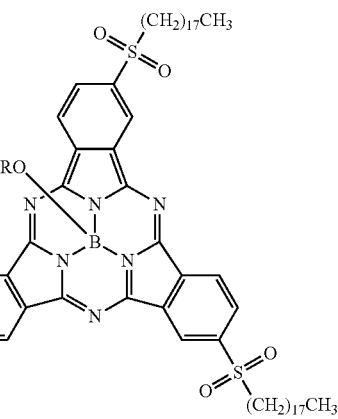
wherein R is methyl;
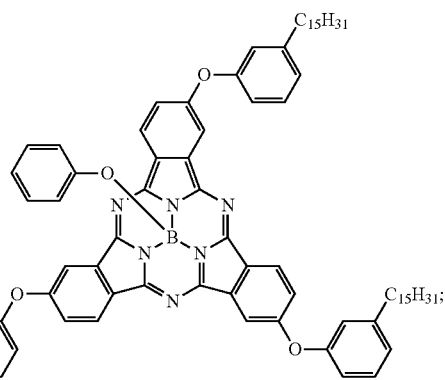

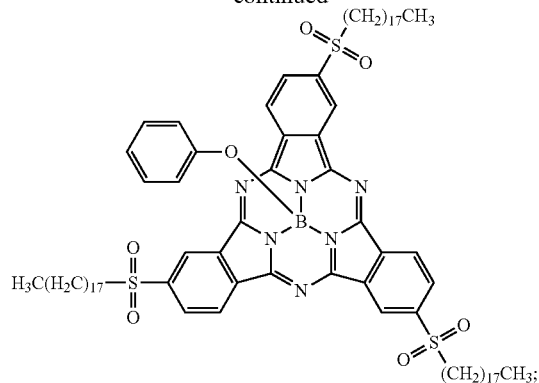

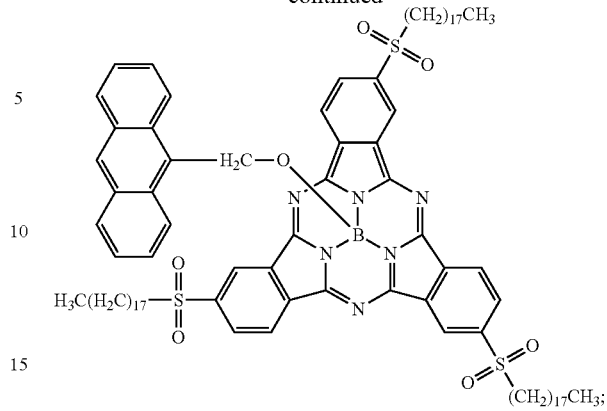

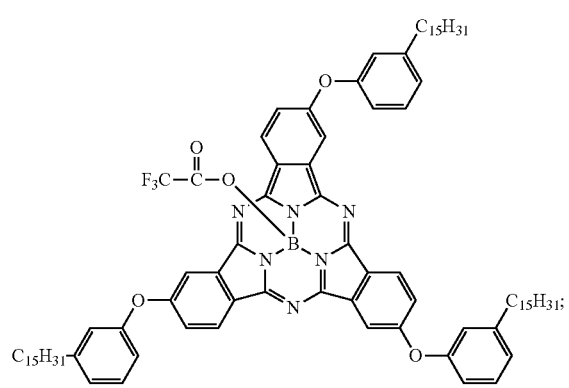

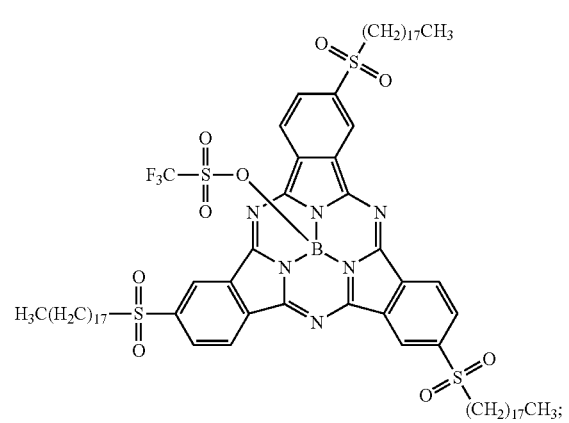

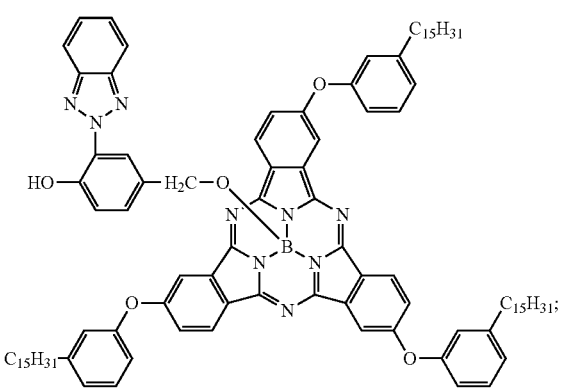

or the like, as well as mixtures thereof.

Compounds of these formulae can be prepared as disclosed in, for example, Brisson et al., "Boron Subphthalocyanine Dyes: 3-pentadecylphenol as a Solubilizing Molecular Fragment," *Ind. Eng. Chem. Res.* 2011, 50, 10910-10917, the disclosure of which is totally incorporated herein by reference. More specifically, the desired phthalonitrile precursor can be refluxed, in some instances at temperatures of up to about 130° C., in the presence of the boron trihalide to yield a compound with Z=halide, as follows:

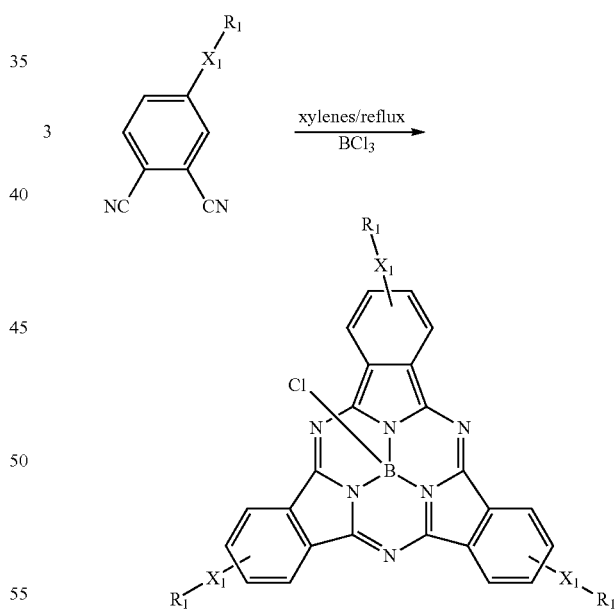

The halide Z group can be converted to an ether group by quenching the reaction product into an aprotic solvent (such as an alcohol or containing a compound such as an alcohol or amine or sulfur-containing functional group) and allowing it to stir for several days:

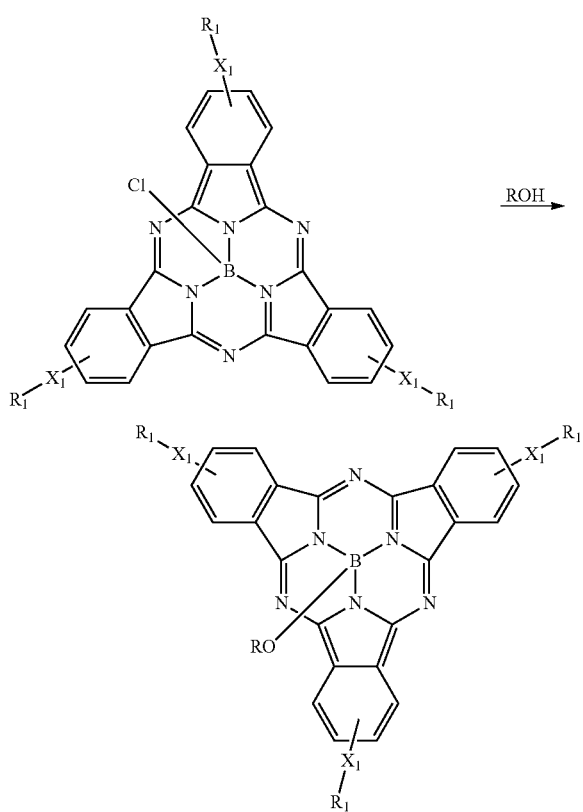

Quenching the reaction product into a solvent (in this instance an aprotic solvent such as an alcohol in the presence of a compound containing an acid functional group is desirable) converts the halide Z group to an ester:

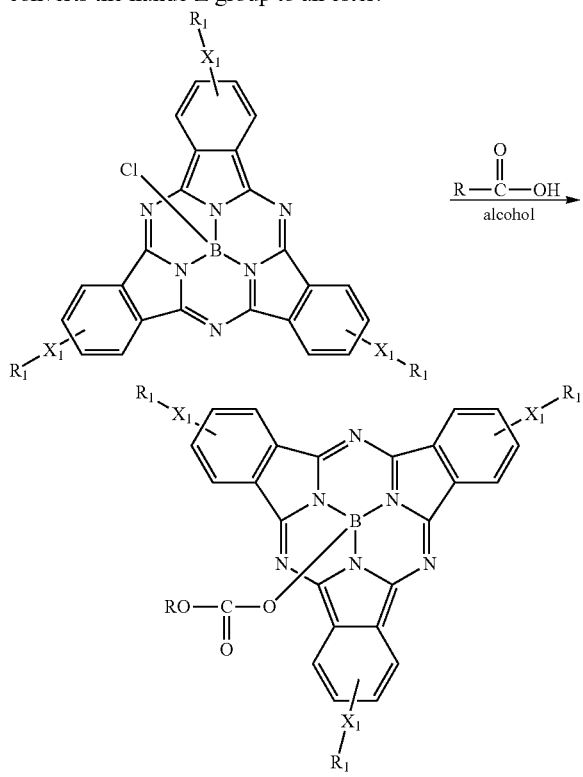

Quenching the reaction product into a solvent (in this instance an aprotic solvent such as an alcohol in the presence of a compound containing an acid functional group is desirable) converts the halide Z group to a sulfonate:

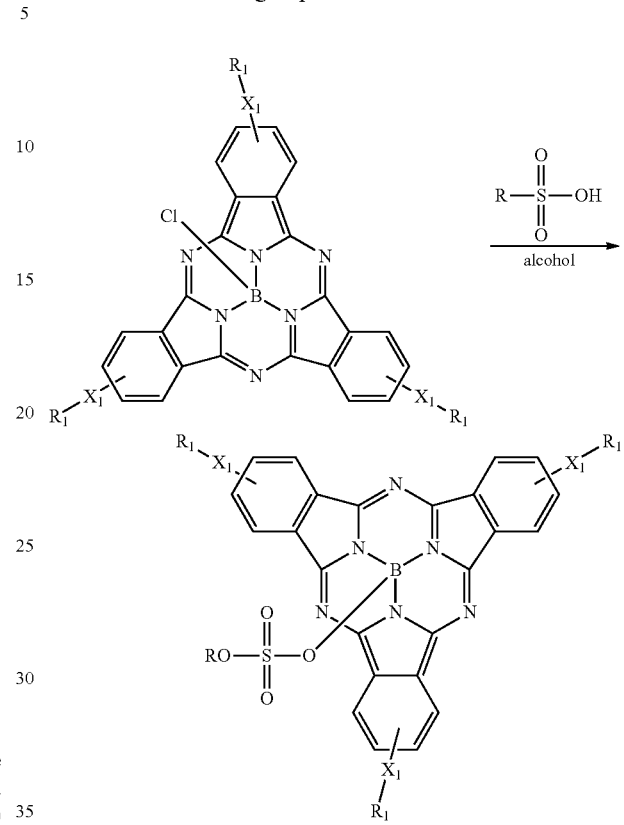

The L*a*b* color space is a well known color system that defines color using L* for lightness and a* and b* for color-opponent dimensions. In addition, c* is a measure of chromaticity. The values reported below are measured on the Gretag Macbeth Spectrolino Spec-chart.

The colorants have a L* value of in one embodiment at least about 40, in another embodiment at least about 43, and in yet another embodiment at least about 45, and in one embodiment no more than about 60, in another embodiment no more than about 57, and in yet another embodiment no more than about 55.

The colorants have a a* value of in one embodiment at least about 35, in another embodiment at least about 38, and in yet another embodiment at least about 40, and in one embodiment no more than about 53, in another embodiment no more than about 50, and in yet another embodiment no more than about 48.

The colorants have a b* value of in one embodiment at least about −24, in another embodiment at least about −26, and in yet another embodiment at least about −28, and in one embodiment no more than about −40, in another embodiment no more than about −38, and in yet another embodiment no more than about −36.

The colorants have a c* value of in one embodiment at least about 49, in another embodiment at least about 51, and in yet another embodiment at least about 53, and in one embodiment no more than about 60, in another embodiment no more than about 58, and in yet another embodiment no more than about 56.

The colorants have a solubility in the ink carrier of in one embodiment at least about 0.1 g/100 g, in another embodiment at least about 1 g/100 g, and in yet another embodiment at least about 5 g/100 g, and in one embodiment no more than about 50 g/100 g, in another embodiment no more than about 25 g/100 g, and in yet another embodiment no more than about 10 g/100 g, measured at a temperature of from about 25° C. to about 130° C. Ink carriers used for measurement were (1) those of Example II, Inks D, 3, and 4 (without the colorants) of U.S. Pat. No. 7,381,254, and (2) that of Example XIV (without the colorant) of U.S. Pat. No. 7,737,278, the disclosures of each of which are incorporated herein by reference. The solubility of the dye in the ink is such that it is readily soluble in the molten ink at about 130° C. and yet remains essentially molecularly dissolved/dispersed when the ink cools to room temperature and solidifies. As the ink begins to cool, the dye does not begin to aggregate and/or precipitate out (which would make it no longer soluble in the solid or in the liquid ink when it is reheated). The solubility remains intact as the ink is repeatedly heated and cooled/solidified.

The colorant is present in the ink in any desired or effective amount to obtain the desired color or hue, in one embodiment of at least about 0.1% by weight of the ink, in another embodiment of at least about 0.5% by weight of the ink, in yet another embodiment of at least about 1% by weight of the ink, in still another embodiment of at least about 2% by weight of the ink, and in another embodiment of at least about 3% by weight of the ink, and in one embodiment of no more than about 20% by weight of the ink, in another embodiment of no more than about 13% by weight of the ink, and in yet another embodiment of no more than about 10% by weight of the ink. The colorant as disclosed herein can either be the sole colorant in the ink or can be present in combination with other colorants.

The inks disclosed herein contain a phase change ink carrier in addition to the colorant. Any desired or effective carrier composition can be used. Examples of suitable ink carrier materials include fatty amides, such as monoamides, triamides, tetra-amides, mixtures thereof, or the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, or the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

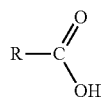

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. Nos. 4,889,560, 4,889,761, 5,194,638, 4,830,671, 6,174,937, 5,372,852, 5,597,856, and 6,174,937, and GB2,238,792, the disclosures of each of which are totally incorporated herein by reference. Also suitable are branched triamides as disclosed in U.S. Pat. No. 6,860,930, the disclosure of which is totally incorporated herein by reference. In one specific embodiment, the branched triamide is of the formula

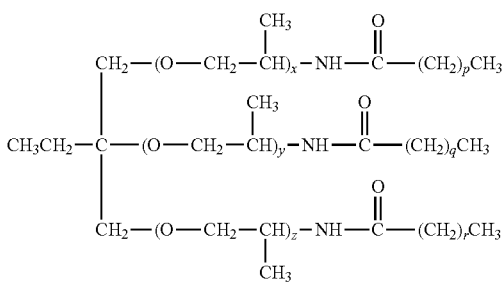

wherein x, y, and z each independently represent the number of propyleneoxy repeat units and x+y+z is from about 5 to about 6, and wherein p, q, and r are integers representing the number of repeat —($CH_2$)— units, wherein p, q, and r each, independently of the others, are from about 34 to about 40.

Also suitable as phase change ink carrier materials are isocyanate-derived resins and waxes, such as urethane isocyanate-derived materials, urea isocyanate-derived materials, urethane/urea isocyanate-derived materials, mixtures thereof, or the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, and 6,309,453, GB2,294,939, GB2,305,928, GB2,305,670, GB2,290,793, WO9414902, WO9712003, WO9713816, WO9614364, WO9733943, and WO9504760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, or the like, ionomers, or the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., Fischer-Tropsch waxes, available from Sasol Wax Americas, Inc., Shelton, Conn., waxes as disclosed in, for example, U.S. Patent Publications 20060257495 and 2005/0130054, the disclosures of which are totally incorporated herein by reference, and waxes as disclosed in U.S. Pat. Nos. 7,407,539, 7,377,971, 7,381,254, 7,311,768, and 7,658,486, the disclosures of each of which are totally incorporated herein by reference.

Also suitable are ink carriers comprising crystalline-amorphous mixtures, such as those disclosed in, for example, U.S. Patent Publications 20120274699, 20120274710, 20120272859, 20120272861, 20120274716, 20120272862, 20120272860, 20120272865, 20120272863, 20120272864, 20120274700, 20120277462, and 20120274698, and Copending application Ser. Nos. 13/196,157, 13/680,271, and Ser. No. 13/196,227, the disclosures of each of which are totally incorporated herein by reference, or the like. Examples of suitable amorphous materials include oxazolines and oxazoline derivatives, esters of citric acid, isosorbide oligomers, polyterpene resins, amorphous rosins and rosin esters, or the like, as well as mixtures thereof. Examples of suitable crystalline materials include those disclosed in U.S. Pat. No. 6,682,587, the disclosure of which is totally incorporated herein by reference, crystalline aromatic monoesters, crystalline diesters, crystalline esters of tartaric acid, crystalline aromatic amides, crystalline oxazolines, trans-cinnamic diesters, or the like, as well as mixtures thereof.

The ink carrier (defined as all of the ink components other than the colorant) is present in the phase change ink in any desired or effective amount, in one embodiment of at least about 0.1% by weight of the ink, in another embodiment of at least about 50% by weight of the ink, and in yet another embodiment of at least about 90% by weight of the ink, and in one embodiment of no more than about 99% by weight of the ink, in another embodiment of no more than about 98% by weight of the ink, and in yet another embodiment of no more than about 95% by weight of the ink.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), or the like. When present, the optional antioxidant is present in the ink in any desired or effective amount, in one embodiment of at least about 0.01% by weight of the ink, in another embodiment of at least about 0.1% by weight of the ink, and in yet another embodiment of at least about 1% by weight of the ink, and in one embodiment of no more than about 20% by weight of the ink, in another embodiment of no more than about 5% by weight of the ink, and in yet another embodiment of no more than about 3% by weight of the ink.

Other optional additives to the inks include clarifiers, such as UNION CAMP® X37-523-235 (commercially available from Union Camp), in an amount in one embodiment of at least about 0.01% by weight of the ink, in another embodiment of at least about 0.1% by weight of the ink, and in yet another embodiment of at least about 5% by weight of the ink, and in one embodiment of no more than about 98% by weight of the ink, in another embodiment of no more than about 50% by weight of the ink, and in yet another embodiment of no more than about 10% by weight of the ink, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), or the like, in an amount in one embodiment of at least about 0.1% by weight of the ink, in another embodiment of at least about 5% by weight of the ink, and in yet another embodiment of at least about 10% by weight of the ink, and in one embodiment of no more than about 98% by weight of the ink, in another embodiment of no more than about 75% by weight of the ink, and in yet another embodiment of no more than about 50% by weight of the ink, adhesives, such as VERSAMID® 757, 759, or 744 (commercially available from Henkel), in an amount in one embodiment of at least about 0.1% by weight of the ink, in another embodiment of at least about 1% by weight of the ink, and in yet another embodiment of at least about 5% by weight of the ink, and in one embodiment of no more than about 98% by weight of the ink, in another embodiment of no more than about 50% by weight of the ink, and in yet another embodiment of no more than about 10% by weight of the ink, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), or the like, in an amount in one embodiment of at least about 0.1% by weight of the ink, in another embodiment of at least about 1% by weight of the ink, and in yet another embodiment of at least about 2% by weight of the ink, and in one embodiment of no more than about 50% by weight of the ink, in another embodiment of no more than about 30% by weight of the ink, and in yet another embodiment of no more than about 10% by weight of the ink, or the like.

The inks disclosed herein are phase change inks. By this is meant that they are solids at a temperature of about 25° C. and are liquids when melted at temperatures of at least about 40° C. or higher.

The ink compositions in one embodiment have peak melting points of no lower than about 50° C., in another embodiment of no lower than about 60° C., and in yet another embodiment of no lower than about 70° C., and have peak melting points in one embodiment of no higher than about 160° C., in another embodiment of no higher than about 140° C., and in yet another embodiment of no higher than about 100° C.

The ink compositions in one embodiment have onset melting points of no lower than about 50° C., in another embodiment of no lower than about 52° C., and in yet another embodiment of no lower than about 55° C., and have onset melting points in one embodiment of no higher than about 150° C., in another embodiment of no higher than about 100° C., and in yet another embodiment of no higher than about 69° C.

The ink compositions generally have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 120° C.) in one embodiment of no more than about 30 centipoise (cps), in another embodiment of no more than about 20 cps, and in yet another embodiment of no more than about 15 cps, and in one embodiment of no less than about 2 cps, in another embodiment of no less than about 5 cps, and in yet another embodiment of no less than about 7 cps. In another specific embodiment, the inks have viscosities of from about 7 to about 15 cps at temperatures of about 110, 115, and/or 120° C.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Part A: Chloride

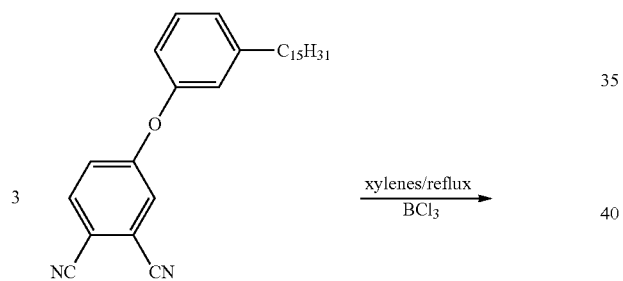

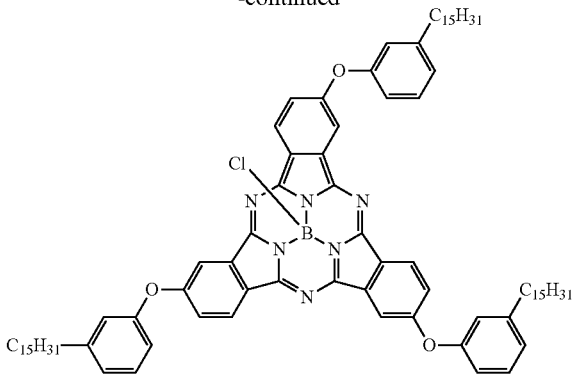

To a 500 mL three-necked, roundbottom flask equipped with Dean-Stark trap, condenser, and TEFLON coated stir magnet was charged 50.0 g 4-(3-pentadecylphenoxy)-phthalonitrile compound, prepared as described in Example I of U.S. Pat. No. 6,472,523, the disclosure of which is totally incorporated herein by reference, and 300 mL xylenes. The flask was placed in a 160° C. oil bath under magnetic stirring, condenser, Dean-Stark apparatus, and light nitrogen blanket. After refluxing for 20 h to remove all water, 42 mL of 1.0M boron trichloride in xylenes (about 4.5 g of actual $BCl_3$) were added under dry conditions via syringe and septum. The solution turned a violet color. The product was believed to be of the formula shown above.

Part B: Methyl Ether

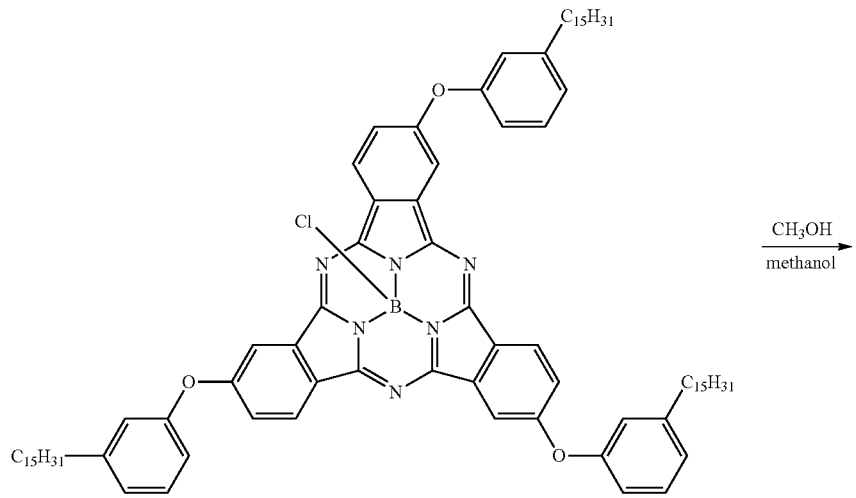

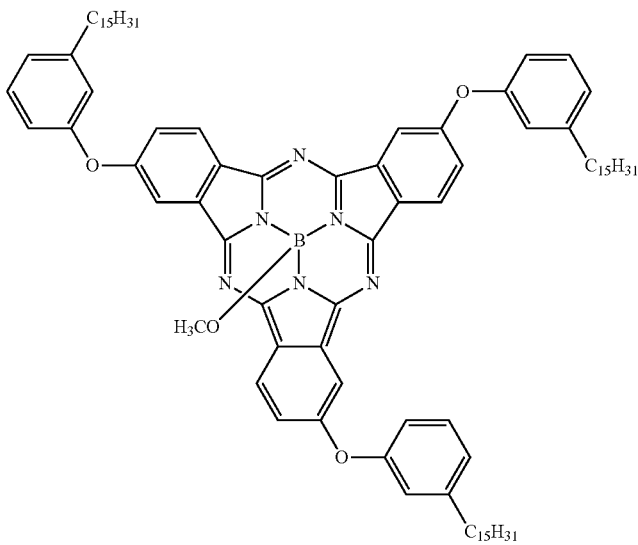

One hour after the addition reaction described in Part A, the solution was quenched into 1 L methanol and allowed to cool and set overnight. The methanol solution was then decanted leaving an oily solid which was collected with toluene. A strong magenta color was apparent in toluene solution. Note: if the solid product was allowed to remain dry overnight the color died. If the solid was dissolved in toluene or hexanes before being able to dry, a beautiful magenta color remained indefinitely. The structure was believe to be that shown above.

EXAMPLE II

Part A: Chloride

To a 500 mL three-necked, roundbottom flask equipped with Dean-Stark trap, condenser, and TEFLON coated stir magnet was charged 8.75 g 4-(3-pentadecylphenoxy)-phthalonitrile compound, prepared as described in Example I of U.S. Pat. No. 6,472,523, and 200 mL xylenes. The flask was placed in a 160° C. oil bath under magnetic stirring, condenser, Dean-Stark apparatus and light nitrogen blanket. After refluxing for 20 h to remove all water, 20 mL of 1.0M boron trichloride in xylenes were added under dry conditions via syringe and septum. The solution turned a violet color.

Part B: Isopropyl Ether

One hour after the addition reaction of Part A, the solution was quenched into 700 mL isopropanol and allowed to cool and set overnight. The isopropanol solution was then decanted leaving an oily solid. The structure is believe to be that shown below:

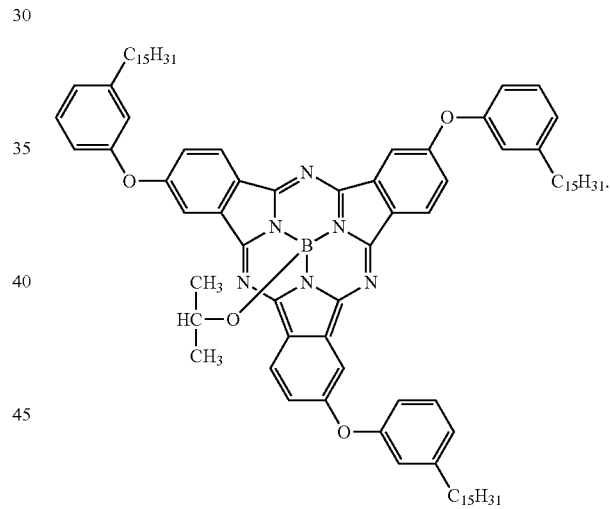

EXAMPLE III

Trifluoroacetate Ester

Part A of Example I was repeated. One hour after the addition reaction described in Part A, the solution was quenched into 1 L methanol with 5 g trifluoroacetic acid, stirred for 20 min, stopped stirring, and allowed to cool and set overnight. The methanol solution was then decanted leaving an oily solid which was collected with toluene. A strong magenta color was apparent in toluene solution. The structure was believed to be that below:

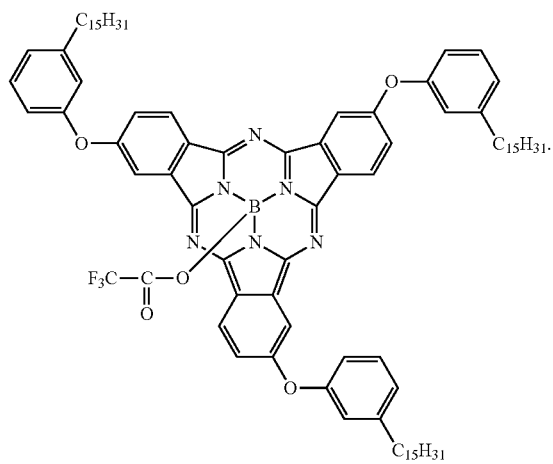

EXAMPLE IV

Part A of Example I was repeated. Refluxing was continued, and 1 h after the addition reaction described in Part A, the solution was quenched equally (i.e., one third into each of three beakers) into three 1 L beakers containing:

A) 500 mL methanol with 1.9 g trifluoromethanesulfonic acid

B) 500 mL methanol with 1.2 g methanesulfonic acid

C) 500 mL methanol with 4.1 g dodecylbenzene sulfonic acid each stirred for 20 min, stopped stirring and allowed to cool and set overnight. The methanol solution was then decanted leaving an oily solid. The oily solids were washed with subsequent 300 mL methanol and decanted leaving deep red solids which were collected with methylene chloride and transferred to jars allowing the methylene chloride to evaporate. Strong magenta colors were apparent when the solids were taken up in toluene solution. The solids were stable indefinitely in air without loss of color. The structures were believed to be those shown below:

A)

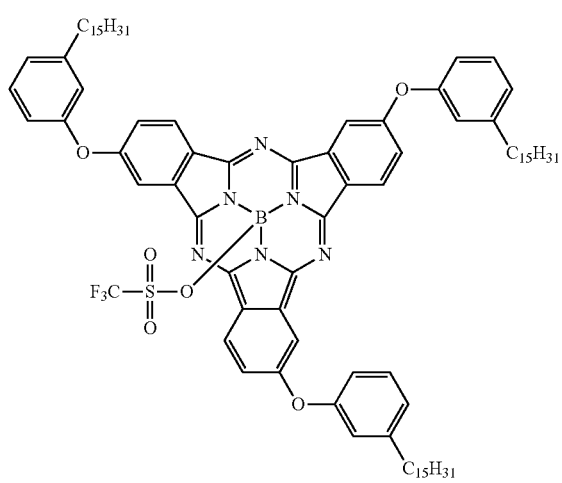

B)

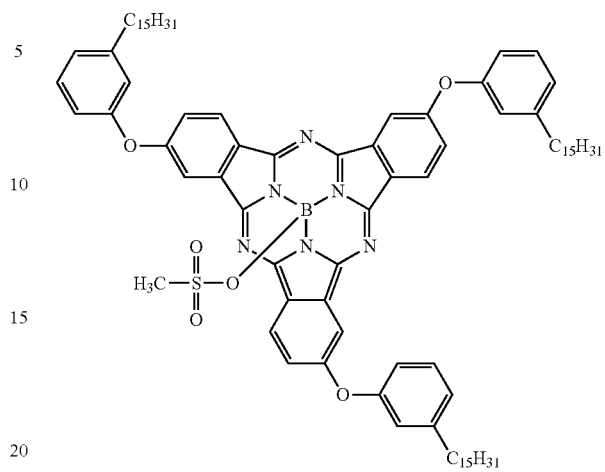

C)

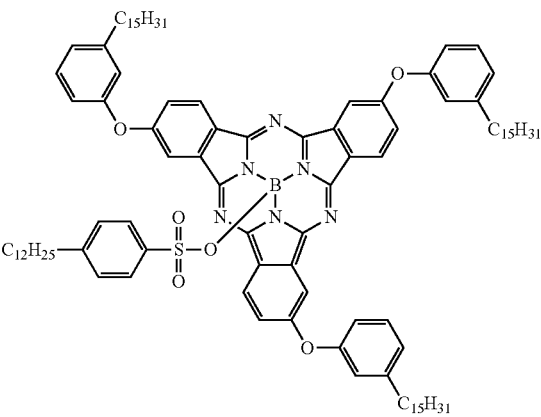

EXAMPLE V

Trifluoroacetate Ester

To a 500 mL one-necked, roundbottom flask, condenser, and TEFLON coated stir magnet was charged 40.0 g 4-(3-pentadecylphenoxy)-phthalonitrile compound, prepared as described in Example I of U.S. Pat. No. 6,472,523, and 230 mL xylenes. The contents of the flask were stirred at room temperature until everything dissolved. An ice bath was then employed to cool the reaction mixture to 0° C. Thereafter, 33.3 mL $BCl_3$ in xylene was added over 30 min though the top of the condenser. The reaction mixture was then stirred for 10 min at 25° C. and placed in a 60° C. oil bath. The temperature of the oil bath was increased to 160° C. and a deep red/purple color began to develop. The reaction mixture was allowed to heat/stir/reflux for 6 h. The purple/magenta reaction mixture was then quenched into 1 L acetone containing 5 g trifluoroacetic acid, stirred for 1 h, covered with a watch-glass, and allowed to cool and settle for 2 days. Thereafter, 1 L methanol was added and the mixture was allowed to settle 2 days, after which the solvent was decanted off. A deep magenta oil was left. Trituration and decantation with 300 mL methanol twice yielded a deep magenta waxy solid which was collected with methylene chloride. A strong magenta color was apparent in toluene solution. The solid was stable indefinitely in air without loss of color.

EXAMPLE VI

Octadecyl Sulfone Substituted Methyl Ether

Part A: Phthalonitrile Intermediate Oxidation

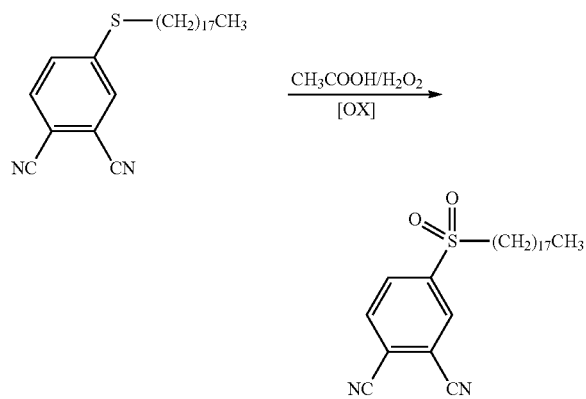

To a 24/40 2 L 3-neck flask with TELFON coated stir magnet, condenser, glass stopper, and constant pressure addition funnel in a silicone oil bath was added 25 g 4-octadecyl-sulfide-phthalonitirile, 137 g methylisobutylketone, and 127 g glacial acetic acid and began stirring. The temperature of the bath was increased from 25° C. to 90° C. and the solids were allowed to dissolve. 125 mL 35% $H_2O_2$ was added to the addition funnel and slowly added over 2 h while the reaction mixture was stirred at 90° C. and then post heated at 90° C. for 1 h. Stirring was then stopped and the mixture was allowed to come to 25° C. and set for 16 h. A white solid cake formed on top of the contents of the flask. The liquid was decanted off and the solids were collected in a Buchner funnel and washed with methanol until no odor was detected. The solid was allowed to dry and thin layer chromatography (TLC) was employed to show the disappearance of the starting S-reactant and the appearance of the final $SO_2$ product. An infrared spectrum was run on the product. The structure was believed to be that shown above.

Part B: Subphthalocyanine Formation

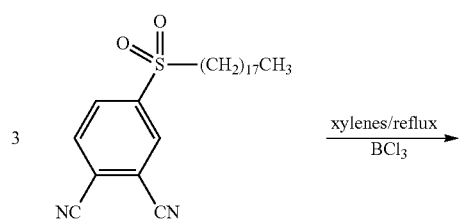

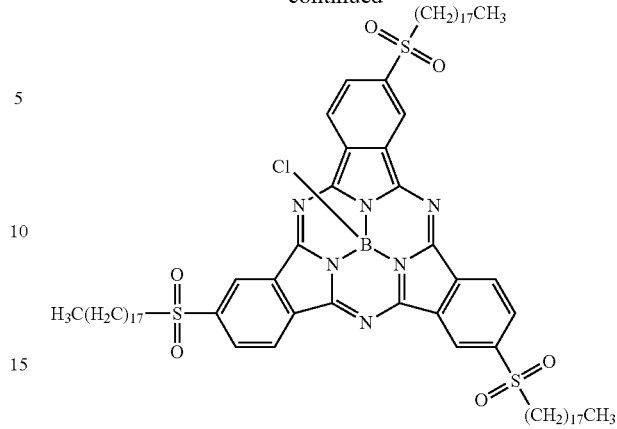

To a 500 mL three-necked, roundbottom flask equipped with Dean-Stark trap, condenser, and TEFLON coated stir magnet was charged 8.75 g of the Intermediate from Part A and 200 mL xylenes. The flask was placed in a 160° C. oil bath under magnetic stirring, condenser, Dean-Stark apparatus and light nitrogen blanket. After refluxing for 5 h to remove all water, 20 mL of 1.0M boron trichloride in xylenes were added under dry conditions via syringe and septum. The solution turned a violet color and refluxing was continued. The structure was believed to be that shown above.

Part C: Methyl Ether Formation

One hour after the addition of $BCl_3$ in Part B, the solution was quenched into a 1 L jar containing 700 mL methanol. The sample was allowed to settle 2 days, after which the solvent was decanted off. A deep magenta oil was left. A strong magenta color was apparent in toluene solution. The structure was believe to be:

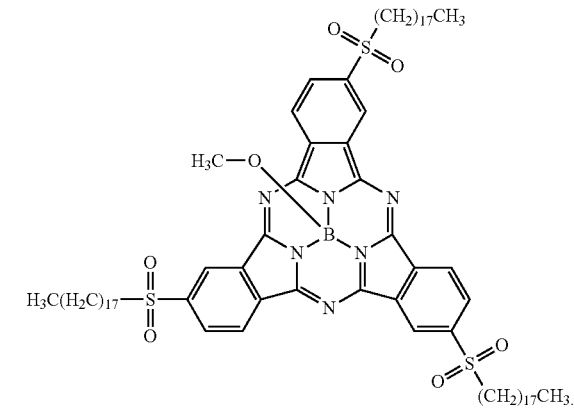

EXAMPLE VII

Radical Quenching Ethers

Part A of Example I was repeated. One hour after the addition reaction described in Part A, 25% of the solution was quenched in equal proportions into 1 L jars containing each the following:

A) 5 g triacetoneaminoalcohol (Creanova) in 250 mL acetonitrile

B) 5 g 2,4-dihydroxybenzophenone (Aldrich) in 250 mL acetonitrile

C) 5 g NORBLOC 6000 (Noramco) in 250 mL acetonitrile and 10 mL toluene

D) 5 g 3,5-di-tert-butyl-4-hydroxybenzyl alcohol (Lancaster) in 250 mL acetonitrile The four reaction products were allowed to set over 3 days, after which the acetonitrile was decanted, leaving the desired products, with the structures believed to be:

A)

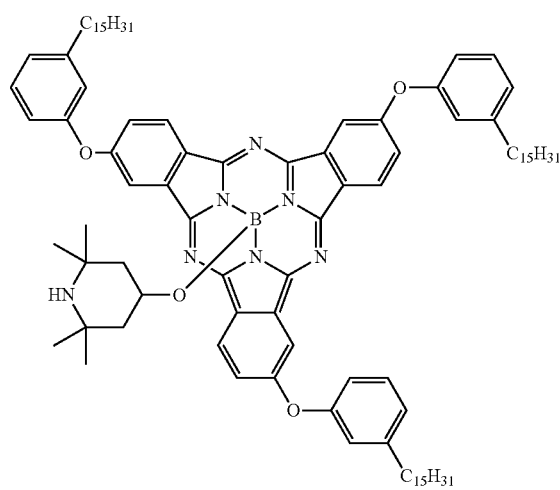

B)

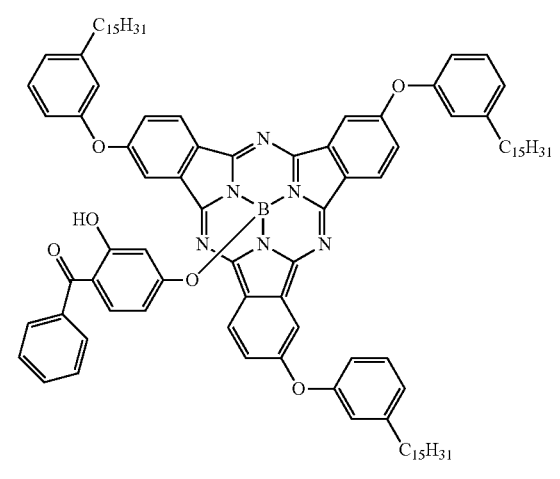

C)

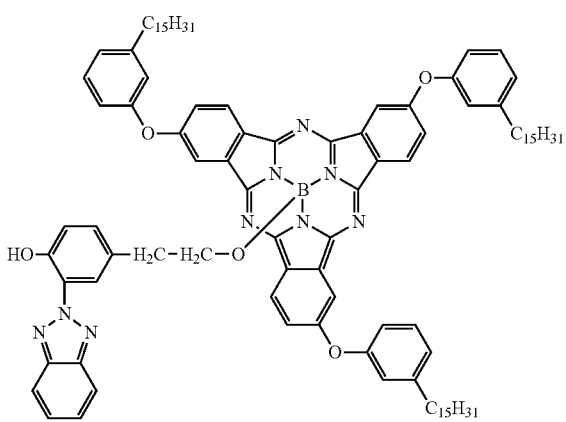

D)

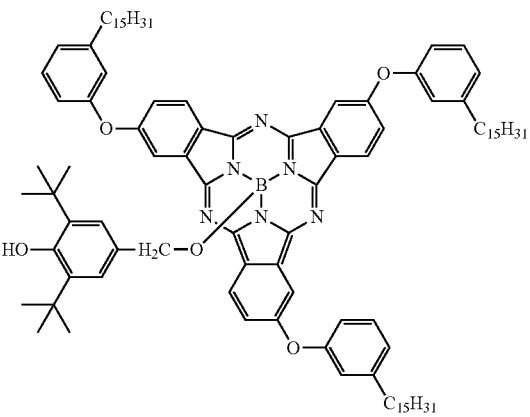

EXAMPLE VIII

Singlet Oxygen Quenching-Stabilizer Ether

Part A of Example II was repeated. One hour after the addition reaction of Part A, the solution was quenched into 500 mL acetonitrile and 1.25 g 9-anthracenemethanol and allowed to cool and set a couple of days. The solvent was then decanted leaving an oily solid. The structure was believe to be that shown below:

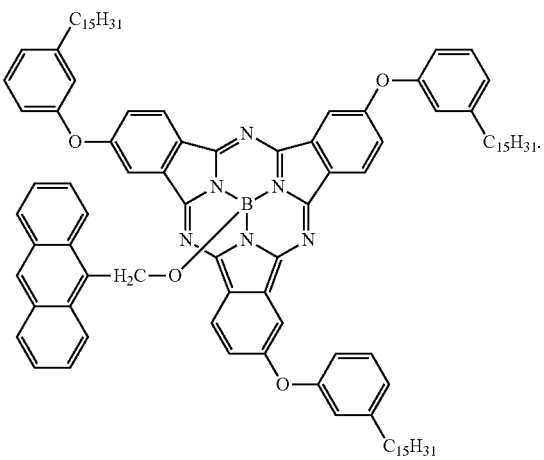

EXAMPLE IX

Singlet Oxygen Quenching-Stabilizer Ether

Parts A and B of Example VI were repeated. One hour after the addition of $BCl_3$ in Part B, the solution was quenched into a 1 L jar containing 500 mL of acetonitrile and 1.25 g 9-anthracenemethanol. The sample was allowed to settle 2 days. The solvent was then decanted off leaving a deep magenta oil. A strong magenta color was apparent in toluene solution. The structure is believe to be:

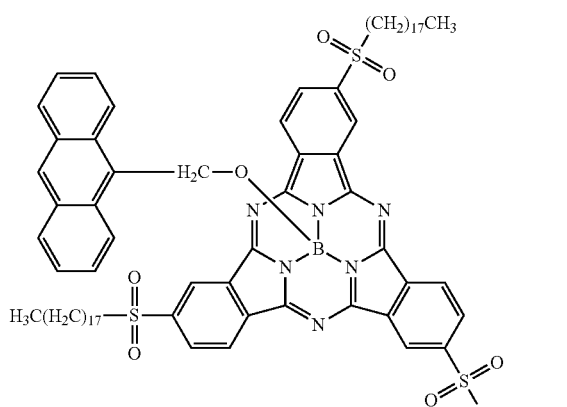

Ink Example 1

Part A: Preparation of Ink Carrier

An ink carrier was prepared by melting, mixing, and filtering the following ingredients:
polyethylene wax (PE655, Baker Petrolite, Tulsa, Okla., $CH_3(CH_2)_{50}CH_3$), 43.59 parts by weight;
stearyl stearamide wax (KEMAMIDE® S-180, Crompton Corporation, Greenwich, Conn.), 19.08 parts by weight;
tetraamide resin obtained from the reaction of one equivalent C-36 dimer acid (Uniqema, New Castle, Del.) with two equivalents of ethylene diamine and UNICID® 700 (Baker Petrolite, Tulsa, Okla., a long chain hydrocarbon having a terminal carboxylic acid group) (prepared as described in Example 1 of U.S. Pat. No. 6,174,937), 18.94 parts by weight;
urethane resin obtained from the reaction of two equivalents ABITOL E hydroabietyl alcohol (Hercules Inc., Wilmington, Del.) and one equivalent isophorone diisocyanate (prepared as described in Example 1 of U.S. Pat. No. 5,782,966), 11.71 parts by weight;
urethane resin that is the adduct of three equivalents stearyl isocyanate and a glycerol-based alcohol (prepared as described in Example 4 of U.S. Pat. No. 6,309,453), 6.48 parts by weight; and
NAUGUARD® 445 antioxidant (Uniroyal Chemical Co., Middlebury, Conn.), 0.20 parts by weight.
600 g of the ink carrier components were added to a 1 L beaker and heated in an oven at 135° C. until molten. Subsequently, the beaker was inserted into a heating mantle set to 135° C. and the contents of the beaker were stirred for 45 min. The resulting ink was then filtered through a combination of Whatman #3 and 0.2 μm NAE filters and placed in a Mott filter assembly. Filtration was supported by the addition of 1% by weight FILTER AID, Fluka Chemika, Switzerland, and proceeded at 135° C. until complete after 6 h. The ink carrier was poured into molds containing 31 g of the carrier and allowed to cool.

Part B: Ink Preparation 30.7 g of ink carrier were placed in a 100 mL beaker with a magnetic stir bar and subsequently placed in a 135° C. oil bath until molten. 0.45 g of the m-pentadecylphenol substituted subphthalocyanine trifluoromethane sulfonic ester prepared as described in Example IV(A) was then added and stirred for 3 h. The magenta colored ink was then poured into an aluminum mold.

Ink Example 2

30.9 g of ink carrier prepared as described in Ink Example 1 were placed in a 100 mL beaker with a magnetic stir bar and subsequently placed in a 135° C. oil bath until molten. 0.57 g of the m-pentadecylphenol substituted subphthalocyanine methane sulfonic ester prepared as described in Example IV(B) was then added and stirred for 3 h. The magenta colored ink was then poured into an aluminum mold.

Ink Example 3

30.4 g of ink carrier prepared as described in Ink Example 1 were placed in a 100 mL beaker with a magnetic stir bar and subsequently placed in a 135° C. oil bath until molten. 0.51 g of the m-pentadecylphenol substituted subphthalocyanine dodecylbenzene sulfonic ester prepared as described in Example IV(C) was then added and stirred for 3 h. The magenta colored ink was then poured into an aluminum mold.

Ink Example 4

30.6 g of ink carrier prepared as described in Ink Example 1 were placed in a 100 mL beaker with a magnetic stir bar and subsequently placed in a 135° C. oil bath until molten. 0.51 g of the m-pentadecylphenol substituted subphthalocyanine trifluoroacetate ester prepared as described in Example III was then added and stirred for 3 h. The magenta colored ink was then poured into an aluminum mold.

Ink Example 5

30.7 g of ink carrier prepared as described in Ink Example 1 were placed in a 100 mL beaker with a magnetic stir bar and subsequently placed in a 135° C. oil bath until molten. 0.45 g of the m-pentadecylphenol substituted subphthalocyanine radical quenching ether prepared as described in Example VII(A) was then added and stirred for 3 h. The magenta colored ink was then poured into an aluminum mold.

Fingerprint and Tape Diffusion Measurements

A test ink was prepared containing the m-pentadecylphenol substituted subphthalocyanine isopropyl ether colorant prepared as described in Example II and the ink carrier prepared as described in Ink Example 1, Part A. K-proofer print samples were prepared from the ink on XEROX® 4200 paper. These proofs showed three different intensities of ink coverage on the paper for each ink, with the different intensities corresponding to three different depths of gravure recesses on the gravure type plates used in the K-proofer. Shortly after print preparation, a test person sparingly spread a hand lotion on the fingers, and brought the fingertips with light to moderate pressure into contact with the print surface. The exposed samples were then stored for 5 days at room temperature, after which period they were inspected. A moderate to weak enhancement of exposed parts of the print surface was noted, particularly in the region with high ink coverage.

Two additional K-proofer print samples were prepared. Shortly after print preparation, transparent adhesive tape was affixed on parts of the edges between printed and non-printed regions of the page. One sample was then exposed to 60° C., the other remained at ambient temperature. After five days, both samples were inspected for development of diffuse edges between printed and non-printed regions. It was found that the sample which was exposed to the higher temperature showed a moderately diffuse edge, whereas the room temperature sample kept a sharp edge, indicating sufficient resistance against tape adhesive-induced dye migration.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising:
   (I) a phase change ink carrier; and
   (II) a colorant compound of the formula

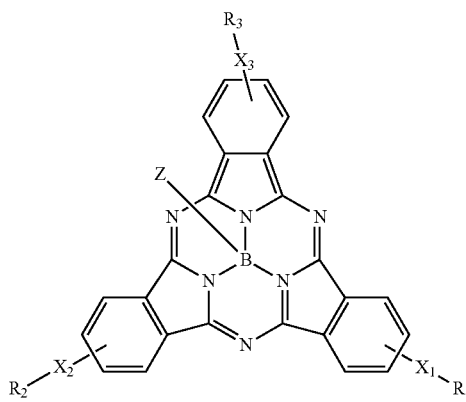

wherein:
(a) $X_1$, $X_2$, and $X_3$ each, independently of the others, is —O—, —S—, —SO—, or —SO$_2$—;
(b) $R_1$, $R_2$, and $R_3$ each, independently of the others, is:
   (1) alkyl, including substituted and unsubstituted alkyl, wherein hetero atoms may optionally be present in alkyl;
   (2) aryl, including substituted and unsubstituted aryl, wherein hetero atoms may optionally be present in aryl;
   (3) arylalkyl, including substituted and unsubstituted arylalkyl, wherein hetero atoms may optionally be present in either the aryl or the alkyl portion of arylalkyl; or
   (4) alkylaryl, including substituted and unsubstituted alkylaryl, wherein hetero atoms may optionally be present in either the aryl or the alkyl portion of alkylaryl; and
(c) Z is:
   (1) halogen;
   (2) —OR$_4$, wherein R$_4$ is:
      (A) alkyl, including substituted and unsubstituted alkyl, wherein hetero atoms may optionally be present in alkyl;
      (B) aryl, including substituted and unsubstituted aryl, wherein hetero atoms may optionally be present in aryl;
      (C) arylalkyl, including substituted and unsubstituted arylalkyl, wherein hetero atoms may optionally be present in either the aryl or the alkyl portion of arylalkyl; or
      (D) alkylaryl, including substituted and unsubstituted alkylaryl, wherein hetero atoms may optionally be present in either the aryl or the alkyl portion of alkylaryl;

(3)

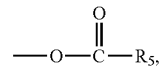

wherein $R_5$ is:
   (A) alkyl, including substituted and unsubstituted alkyl, wherein hetero atoms may optionally be present in alkyl;
   (B) aryl, including substituted and unsubstituted aryl, wherein hetero atoms may optionally be present in aryl;
   (C) arylalkyl, including substituted and unsubstituted arylalkyl, wherein hetero atoms may optionally be present in either the aryl or the alkyl portion of arylalkyl; or
   (D) alkylaryl, including substituted and unsubstituted alkylaryl, wherein hetero atoms may optionally be present in either the aryl or the alkyl portion of alkylaryl; or (4)

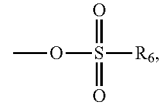

wherein $R_6$ is:
   (A) alkyl, including substituted and unsubstituted alkyl, wherein hetero atoms may optionally be present in alkyl;
   (B) aryl, including substituted and unsubstituted aryl, wherein hetero atoms may optionally be present in aryl;
   (C) arylalkyl, including substituted and unsubstituted arylalkyl, wherein hetero atoms may optionally be present in either the aryl or the alkyl portion of arylalkyl; or
   (D) alkylaryl, including substituted and unsubstituted alkylaryl, wherein hetero atoms may optionally be present in either the aryl or the alkyl portion of alkylaryl.

2. An ink according to claim 1 wherein the colorant compound is present in the ink in an amount of at least about 0.1% by weight of the ink.

3. An ink according to claim 1 wherein the colorant compound is present in the ink in an amount of no more than about 20% by weight of the ink.

4. An ink according to claim 1 wherein the carrier comprises a branched triamide.

5. An ink according to claim 4 wherein the branched triamide is of the formula

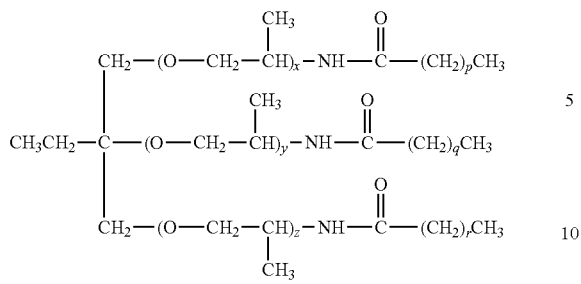

wherein x, y, and z each independently represent the number of propyleneoxy repeat units and x+y+z is from about 5 to about 6, and wherein p, q, and r are integers representing the number of repeat —($CH_2$)— units, wherein p, q, and r each, independently of the others, are from about 34 to about 40.

6. An ink according to claim 1 wherein the carrier comprises an amorphous component and a crystalline component.

7. An ink according to claim 1 wherein —$X_1$—$R_1$, —$X_2$—$R_2$, and —$X_3$—$R_3$ are:

(a)

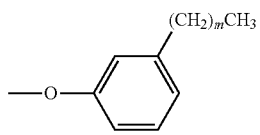

wherein m is an integer representing the number of repeat $CH_2$ units;

(b)

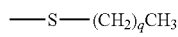

wherein q is an integer representing the number of repeat $CH_2$ units;

(c)

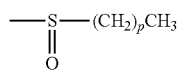

wherein p is an integer representing the number of repeat $CH_2$ units;

(d)

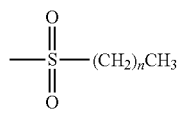

wherein n is an integer representing the number of repeat $CH_2$ units; or (e) combinations thereof.

8. An ink according to claim 1 wherein —$X_1$—$R_1$, —$X_2$—$R_2$, and —$X_3$—$R_3$ are each

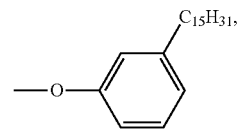

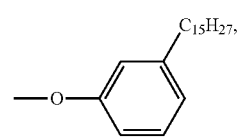

or

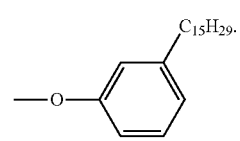

9. An ink according to claim 1 wherein —$X_1$—$R_1$, —$X_2$—$R_2$, and —$X_3$—$R_3$ are each

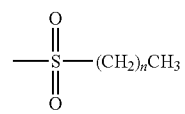

wherein n is an integer of from about 8 to about 50.

10. An ink according to claim 1 wherein Z is

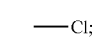

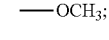

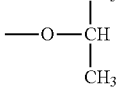

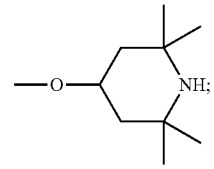

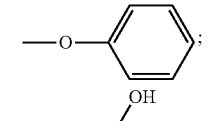

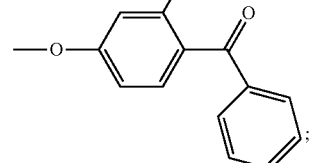

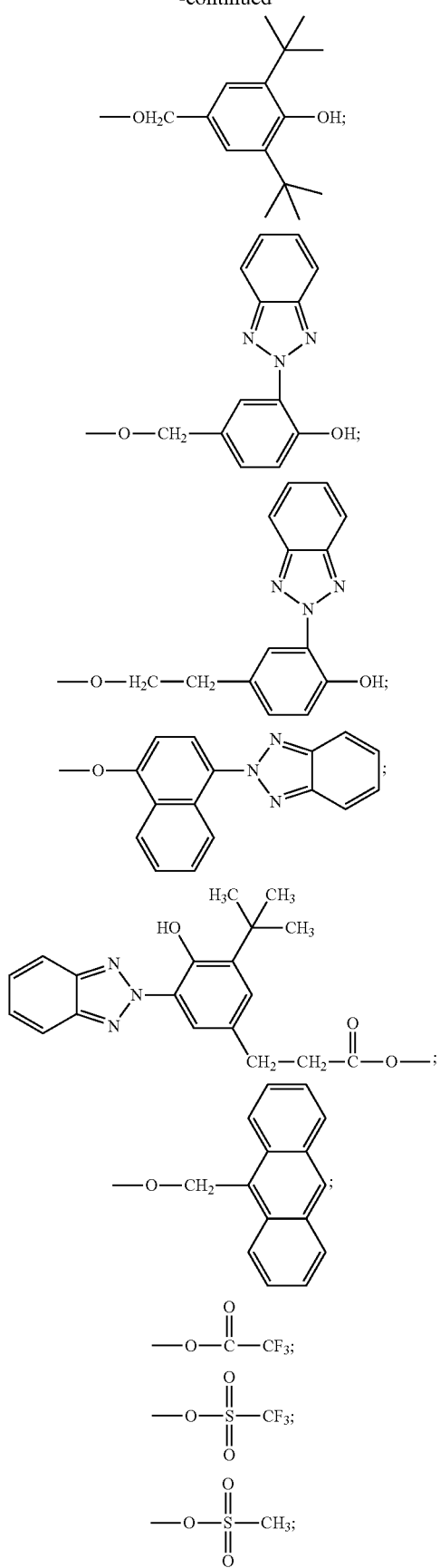
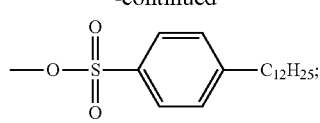
or mixtures thereof.
11. An ink according to claim 1 wherein the colorant is of the formula
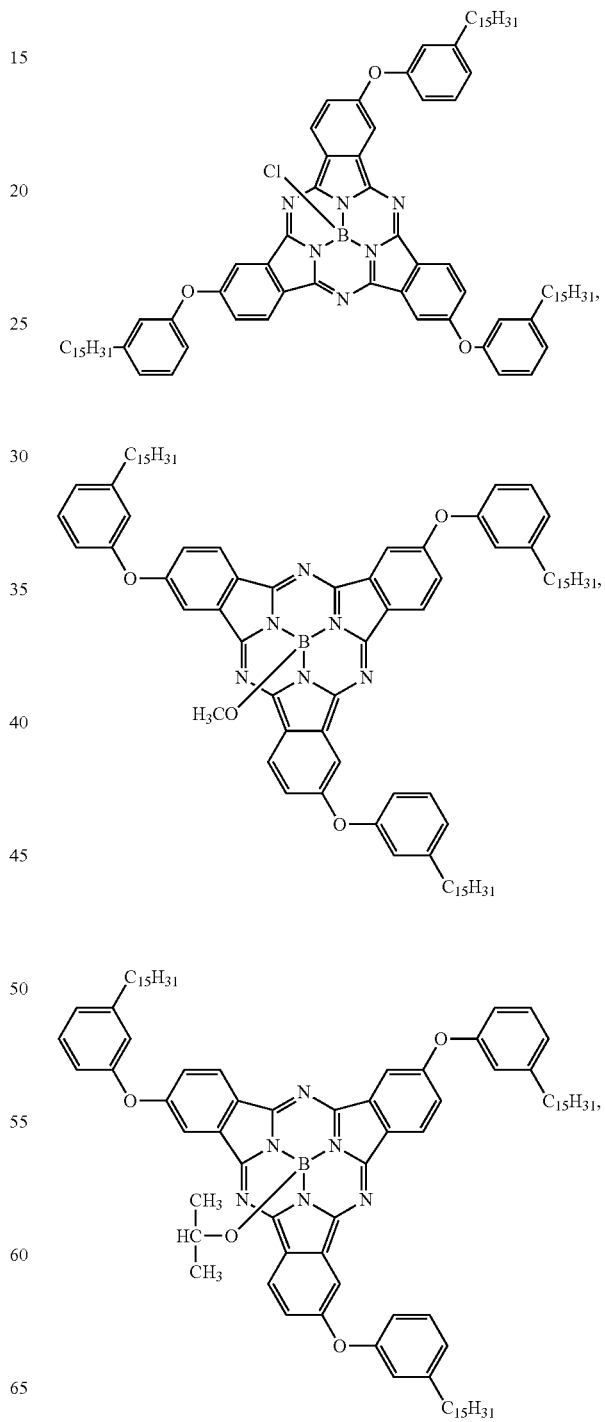

37
-continued
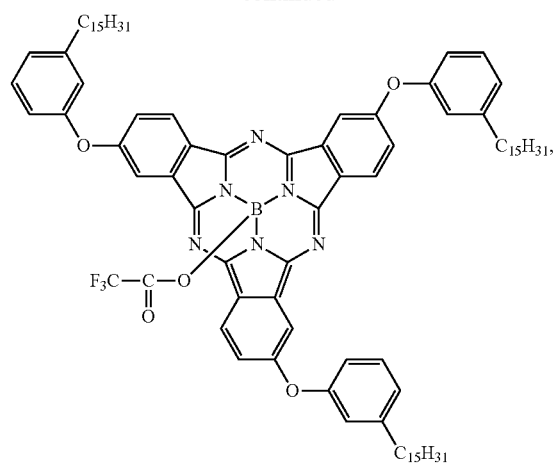
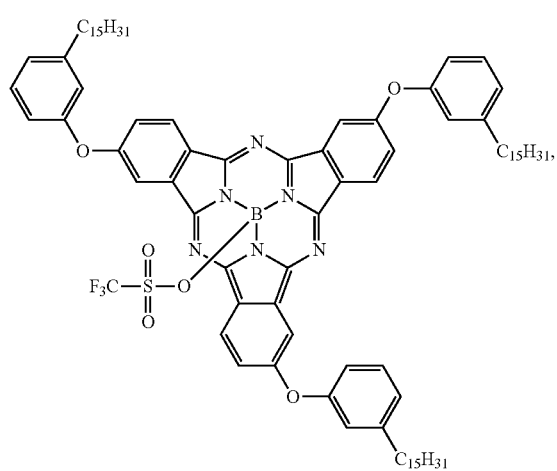
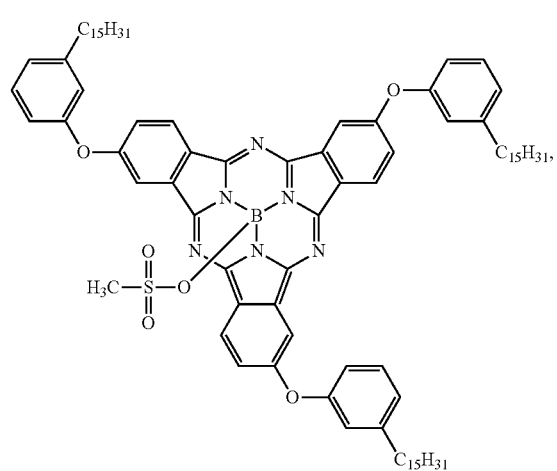
38
-continued
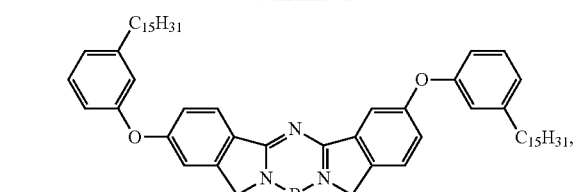
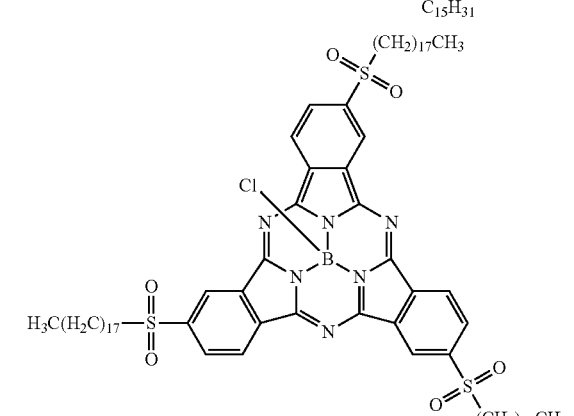
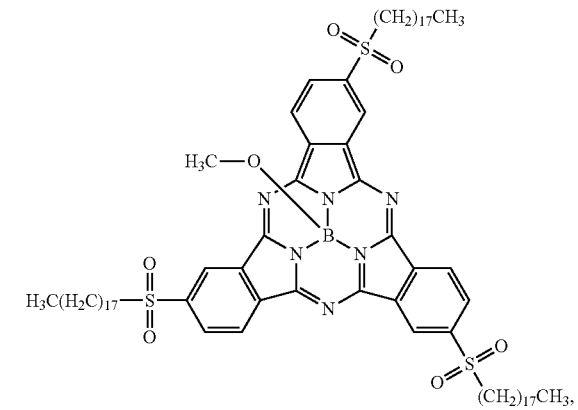
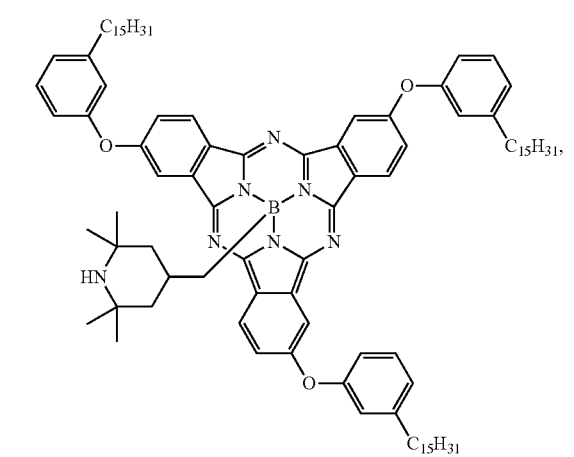

-continued

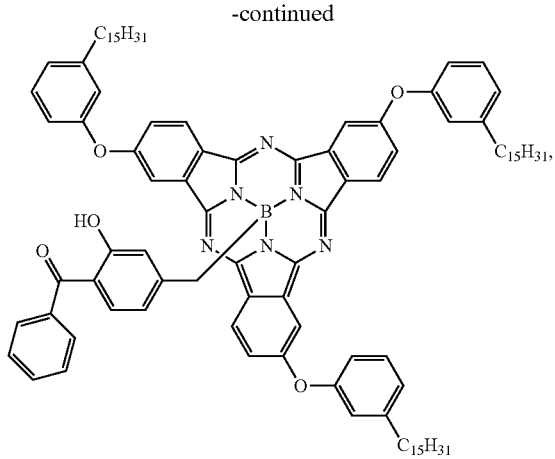

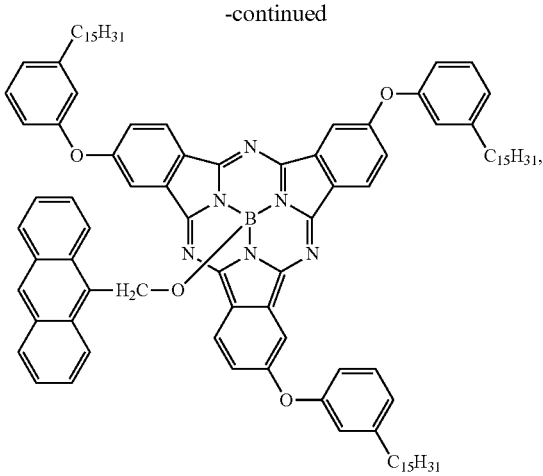

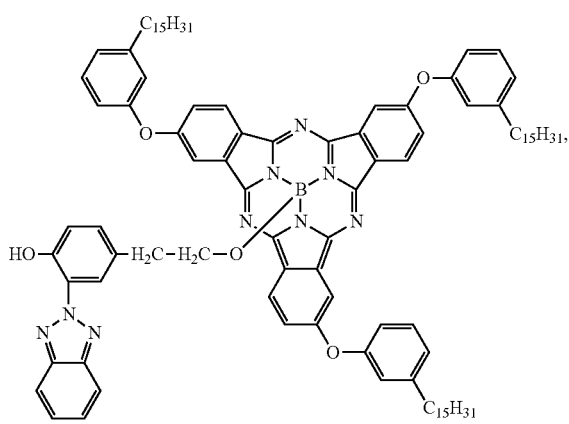

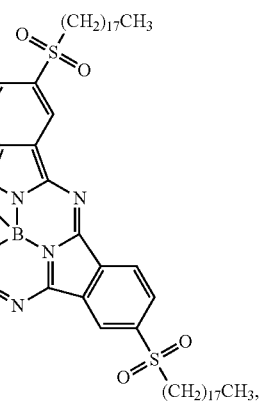

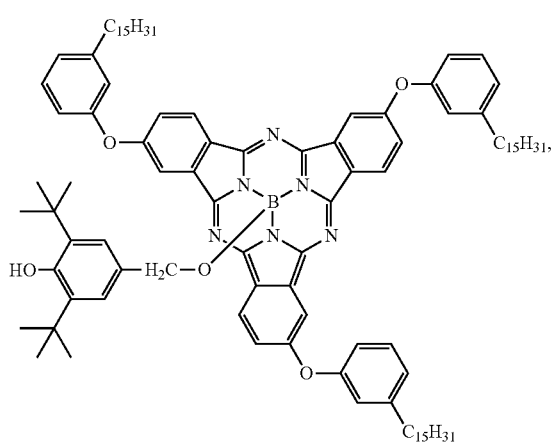

or mixtures thereof.

12. An ink according to claim 1 wherein the colorant has a L* value of at least about 40, and wherein the colorant has a L* value of no more than about 60.

13. An ink according to claim 1 wherein the colorant has a a* value of at least about 35, and wherein the colorant has a a* value of no more than about 53.

14. An ink according to claim 1 wherein the colorant has a b* value of at least about −24, and wherein the colorant has a b* value of no more than about −40.

15. An ink according to claim 1 wherein the colorant has a c* value of at least about 49, and wherein the colorant has a c* value of no more than about 60.

16. An ink according to claim 1 wherein the colorant has a solubility in the ink carrier of at least about 0.1 g/100 g at a temperature of from about 25° C. to about 130° C.

17. A phase change ink comprising:
(I) a phase change ink carrier; and
(II) a colorant compound of the formula

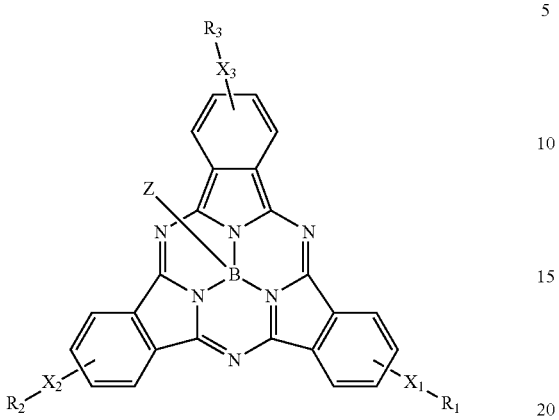

wherein:
(a) $X_1$, $X_2$, and $X_3$ each, independently of the others, is —O—, —S—, —SO—, or —SO$_2$—;
(b) $R_1$, $R_2$, and $R_3$ each, independently of the others, is:
(1) alkyl, including substituted and unsubstituted alkyl, wherein hetero atoms may optionally be present in alkyl;
(2) aryl, including substituted and unsubstituted aryl, wherein hetero atoms may optionally be present in aryl;
(3) arylalkyl, including substituted and unsubstituted arylalkyl, wherein hetero atoms may optionally be present in either the aryl or the alkyl portion of arylalkyl; or
(4) alkylaryl, including substituted and unsubstituted alkylaryl, wherein hetero atoms may optionally be present in either the aryl or the alkyl portion of alkylaryl; and
(c) Z is:
(1) halogen;
(2) —OR$_4$, wherein $R_4$ is:
(A) alkyl, including substituted and unsubstituted alkyl, wherein hetero atoms may optionally be present in alkyl;
(B) aryl, including substituted and unsubstituted aryl, wherein hetero atoms may optionally be present in aryl;
(C) arylalkyl, including substituted and unsubstituted arylalkyl, wherein hetero atoms may optionally be present in either the aryl or the alkyl portion of arylalkyl; or
(D) alkylaryl, including substituted and unsubstituted alkylaryl, wherein hetero atoms may optionally be present in either the aryl or the alkyl portion of alkylaryl;
(3)

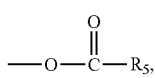

wherein $R_5$ is:
(A) alkyl, including substituted and unsubstituted alkyl, wherein hetero atoms may optionally be present in alkyl;
(B) aryl, including substituted and unsubstituted aryl, wherein hetero atoms may optionally be present in aryl;
(C) arylalkyl, including substituted and unsubstituted arylalkyl, wherein hetero atoms may optionally be present in either the aryl or the alkyl portion of arylalkyl; or
(D) alkylaryl, including substituted and unsubstituted alkylaryl, wherein hetero atoms may optionally be present in either the aryl or the alkyl portion of alkylaryl; or (4)

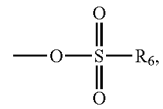

wherein $R_6$ is:
(A) alkyl, including substituted and unsubstituted alkyl, wherein hetero atoms may optionally be present in alkyl;
(B) aryl, including substituted and unsubstituted aryl, wherein hetero atoms may optionally be present in aryl;
(C) arylalkyl, including substituted and unsubstituted arylalkyl, wherein hetero atoms may optionally be present in either the aryl or the alkyl portion of arylalkyl; or
(D) alkylaryl, including substituted and unsubstituted alkylaryl, wherein hetero atoms may optionally be present in either the aryl or the alkyl portion of alkylaryl;

wherein the colorant has:
(i) a L* value of from about 40 to about 60;
(ii) a a* value of from about 35 to about 53;
(iii) a b* value of from about −24 to about −40; and
(iv) a c* value of from about 49 to about 60.

18. An ink according to claim 17 wherein —$X_1$—$R_1$, —$X_2$—$R_2$, and —$X_3$—$R_3$ are:
(a)

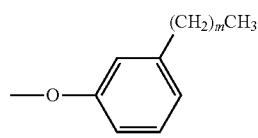

wherein m is an integer representing the number of repeat CH$_2$ units;
(b)

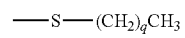

wherein q is an integer representing the number of repeat CH$_2$ units;

(c)

$$-\underset{\underset{O}{\|}}{S}-(CH_2)_pCH_3$$

wherein p is an integer representing the number of repeat CH₂ units;

(d)

$$-\underset{\underset{O}{\|}}{\overset{\overset{O}{\|}}{S}}-(CH_2)_nCH_3$$

wherein n is an integer representing the number of repeat CH₂ units; or (e) combinations thereof.

19. An ink according to claim 17 wherein Z is

—Cl;

—OCH₃;

—O—CH(CH₃)₂;

—O— (2,2,6,6-tetramethylpiperidin-4-yl with NH);

—O—phenyl;

—O— (2-hydroxy-4-substituted phenyl ketone with phenyl, i.e., 2-hydroxy-4-alkoxybenzophenone);

—OH₂C— (3,5-di-tert-butyl-4-hydroxyphenyl);

—O—CH₂—(3-(2H-benzotriazol-2-yl)-4-hydroxyphenyl);

-continued

—O—H₂C—CH₂— (3-(2H-benzotriazol-2-yl)-4-hydroxyphenyl);

—O— (4-(2H-benzotriazol-2-yl)naphthalen-1-yl);

—(3-(2H-benzotriazol-2-yl)-2-hydroxy-5-(1,1-dimethylethyl)phenyl)—CH₂—CH₂—C(=O)—O—;

—O—CH₂— (anthracen-9-yl);

—O—C(=O)—CF₃;

—O—S(=O)₂—CF₃;

—O—S(=O)₂—CH₃;

—O—S(=O)₂—(4-C₁₂H₂₅-phenyl);

or mixtures thereof.

20. A phase change ink comprising:

(I) a phase change ink carrier comprising an amide compound; and (II) a colorant compound, present in the ink in amount of from about 0.1% to about 20% by weight of the ink, of the formula

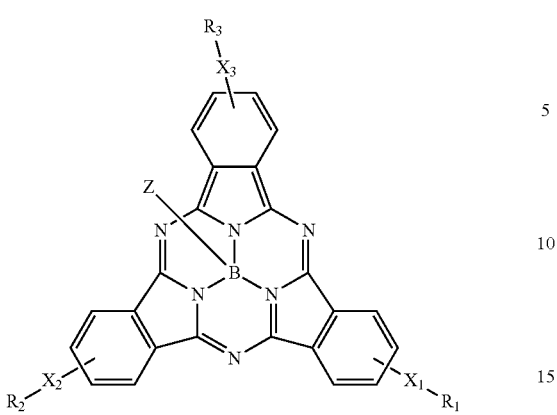

wherein:
(a) $X_1$, $X_2$, and $X_3$ each, independently of the others, is —O—, —S—, —SO—, or —SO$_2$—;
(b) $R_1$, $R_2$, and $R_3$ each, independently of the others, is:
  (1) alkyl, including substituted and unsubstituted alkyl, wherein hetero atoms may optionally be present in alkyl;
  (2) aryl, including substituted and unsubstituted aryl, wherein hetero atoms may optionally be present in aryl;
  (3) arylalkyl, including substituted and unsubstituted arylalkyl, wherein hetero atoms may optionally be present in either the aryl or the alkyl portion of arylalkyl; or
  (4) alkylaryl, including substituted and unsubstituted alkylaryl, wherein hetero atoms may optionally be present in either the aryl or the alkyl portion of alkylaryl; and
(c) Z is:
  (1) halogen;
  (2) —OR$_4$, wherein $R_4$ is:
    (A) alkyl, including substituted and unsubstituted alkyl, wherein hetero atoms may optionally be present in alkyl;
    (B) aryl, including substituted and unsubstituted aryl, wherein hetero atoms may optionally be present in aryl;
    (C) arylalkyl, including substituted and unsubstituted arylalkyl, wherein hetero atoms may optionally be present in either the aryl or the alkyl portion of arylalkyl; or
    (D) alkylaryl, including substituted and unsubstituted alkylaryl, wherein hetero atoms may optionally be present in either the aryl or the alkyl portion of alkylaryl;
(3)

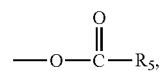

wherein $R_5$ is: alkyl, including substituted and unsubstituted alkyl, wherein hetero atoms may optionally be present in alkyl; or
(4)

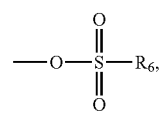

wherein $R_6$ is: alkyl, including substituted and unsubstituted alkyl, wherein hetero atoms may optionally be present in alkyl;
said ink having:
  (i) a peak melting point of from about 50° C. to about 160° C.;
  (ii) an onset melting point of from about 50° C. to about 75° C.;
  (iii) a melt viscosity at the jetting temperature of from about 2 cps to about 30 cps.

\* \* \* \* \*